United States Patent [19]

Chern

[11] Patent Number: 4,878,662

[45] Date of Patent: Nov. 7, 1989

[54] EXERCISE MACHINE WEIGHT GUIDE

[76] Inventor: Lu-Meng Chern, No. 4, Lane 42, Holi St., Taiping Hsiang, Taichung Hsien, Taiwan

[21] Appl. No.: 301,040

[22] Filed: Jan. 24, 1989

[51] Int. Cl.$^4$ .............................................. A63B 21/06
[52] U.S. Cl. .................................. 272/118; 403/259; 403/260
[58] Field of Search ................. 272/93, 113, 117, 118, 272/134, 143; 403/200, 259, 260, 261

[56] References Cited

U.S. PATENT DOCUMENTS

| | | | |
|---|---|---|---|
| 4,349,192 | 9/1982 | Lambert, Jr. et al. | 272/118 |
| 4,461,195 | 7/1984 | Barnick | 403/259 X |
| 4,470,596 | 9/1984 | Desiderio | 272/118 |
| 4,648,594 | 3/1987 | Schleffendorf | 272/117 X |
| 4,691,916 | 9/1987 | Voris | 272/143 X |

FOREIGN PATENT DOCUMENTS 490084  1/1930  Fed. Rep. of Germany ...... 403/259

Primary Examiner—Richard J. Apley
Assistant Examiner—Robert W. Bahr
Attorney, Agent, or Firm—Bacon & Thomas

[57] ABSTRACT

An exercise machine weight guide including an uppermost plate with a centrally disposed mounting hole. The mounting hole is designed to accommodate a threaded plug and a securing plug. A weight post with one threaded end and a number of apertures disposed along its length is inserted through the opening of the uppermost plate. The threaded plug has internal threads for securing over the threaded end of the weight post. The securing plug is positioned over the threaded plug and engages, of a corresponding set of threads, with the threads located within the mounting hole. A number of weights are disposed below the uppermost plate. The lower surface of each weight has a groove which allows a connector pin to pass under the weight and through an aperture of the weight post. The threaded plug is rotated to tighten the assembly to form a single mass of weight and securing plug is rotated to tighten against the threaded plug locking the threaded plug in place. To change the weight, the procedure is reversed.

2 Claims, 4 Drawing Sheets

EXERCISE MACHINE WEIGHT GUIDE

BACKGROUND OF THE INVENTION

This invention relates to physical exercise equipment for developing human muscles, and in particular to a weight guide for use in such equipment.

In the past, various types of mechanical exercise equipment have been used to increase muscle strength and size. Several of these devices involve the use of weights and naturally require some means of guiding and securing the weights used.

One such configuration has utilized a pair of vertical rods with a pulley-guided cable centrally located between them and attaching to the uppermost plate or weight. A third rod extending down from the uppermost plate is provided with a plurality of holes thereon for the inserting of a pin below a desired number of weights. For ease of operation and assembly this configuration is provided with quite large tolerances and many of the parts fit loosely. As a result the apparatus is quite noisy during operation and some parts have the tendency to become loose and fall out, thus causing accidents and possibly injury to the user.

Although such prior arts as Schleffendorf U.S. No. 4,648,594 teaches a cabling system for lifting the weight in stages and Schleffendorf U.S. Pat. No. 4,625,959 teaches an elaborate channel system for containing the weights, neither addresses the matter of securely fastening the weights.

SUMMARY OF THE INVENTION

The present invention provides an exercise machine weight guide which securely fixes the weight as a single unit, thus significantly reducing the noise associated with prior arts and greatly increasing the safety of the exercise machine by preventing parts from coming loose due to vibration during operation.

Another object of the present invention is to provide a low cost, easily assembled and easily usable weight guide which is adaptable to many different types of exercise equipment.

These and additional objects, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENT

Figure 1:
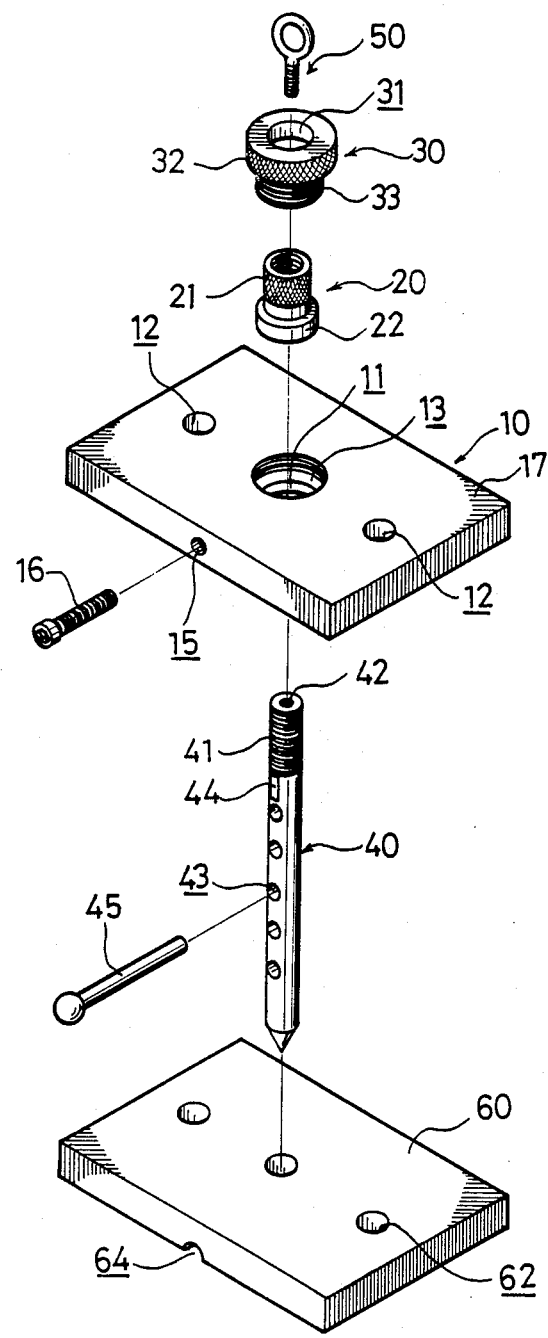
FIG. 1 is an exploded view of a weight guide in accordance with the present invention.

In FIG. 1, an exercise machine weight guide is shown which comprises an uppermost plate 10 having a mounting hole 11 and two guide post holes 12. The mounting hole 11 has two different diameters. The uppermost hole 13 is larger and threaded and the lower smaller hole 14 is smooth and of a size to accommodate the diameter of the weight post 40.

Referring again to FIG. 1, an internally threaded plug 20 is provided which has a narrower cylindrical end 21 and an integral annular lip 22 at the other end. The annular lip 22 is of such a size to be fittable within a lower cylindrical opening of a cylindrical securing plug 30. The securing plug 30 is made up of a stepped central hole 31 composed of two sections of different diameters. The upper section is of a size to accommodate the outer diameter of the threaded plug 20 while the lower section, as noted above, corresponds to the diameter of the annular lip 22.

The outer surface of the securing plug 30 consists of an upper and a lower section. The upper section 32 is larger than the mounting hole 11 such that a bearing surface is provided against the upper surface 17 of the uppermost plate 10. The lower section 33 of the outer surface is externally threaded with threads corresponding to that of the threaded hole 13 of the mounting hole 11.

A weight post 40, which is solid and rod-like in shape, has a threaded end 41 to correspond with the internal threading of the threaded plug 20. At the same end 41, the weight post 40 has also a centrally axially threaded hole 42 for receiving a threaded screw eye 50 for attachment of cables (not shown). Along the length of the weight post 40 is disposed a plurality of parallel evenly spaced apertures 43 of such diameter to accommodate the inserting of a connector pin 45.

Further, a positioning bolt 16 threadedly engages with a hole 15 provided in the uppermost plate 10 perpendicular to the axis of the weight post 40. The end of the positioning bolt 16 protrudes into the opening 11 allowing the end of the bolt 16 to contact a slot 44 disposed on the weight post 40 to prevent rotation thereof.

Figure 2:
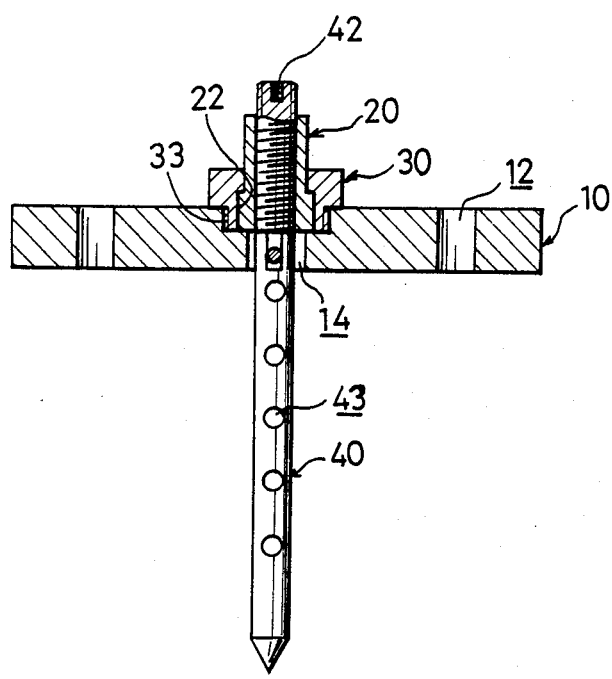
FIG. 2 is a cross-sectional view of the weight guide of FIG. 1 showing the uppermost plate assembled with the weight post.

Further referring to FIG. 2, a better understanding of the relationship of the above-mentioned parts can be obtained. The weight post 40 is inserted to the mounting hole 11 and held in the vertical position by the threaded plug 20 bearing against an upper surface of the mounting hole 11. The securing plug 30 is then placed over the weight post 40 and the threaded plug 20 and engages with the uppermost plate 10 by means of the threads located in the mounting hole 11. The positioning bolt 16 is then inserted to the hole 15 to fix the position of the weight post 40 and prevent its rotation thereafter.

Figure 3:
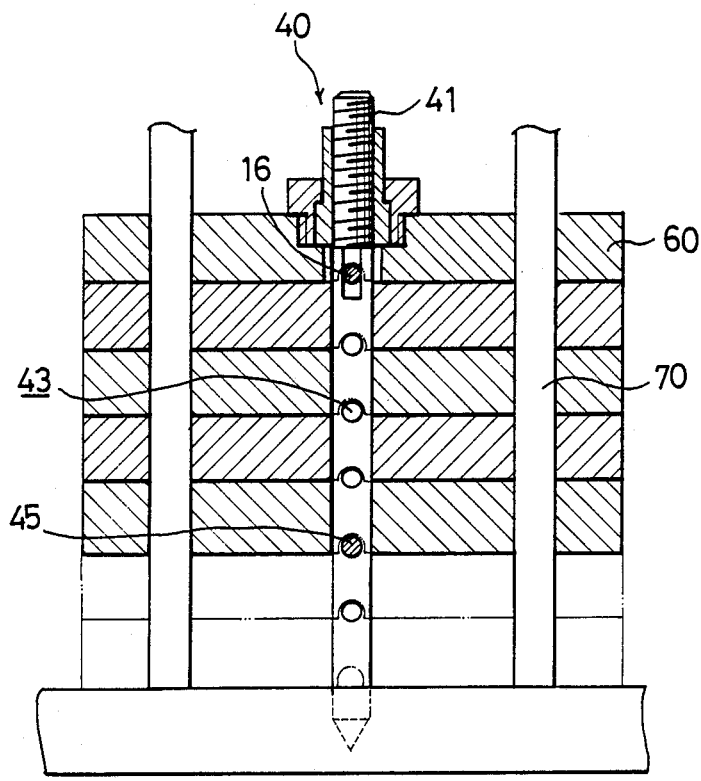
FIG. 3 is a cross-sectional view of the weight guide of FIG. 1 assembled to a plurality of weights.
Figure 4:
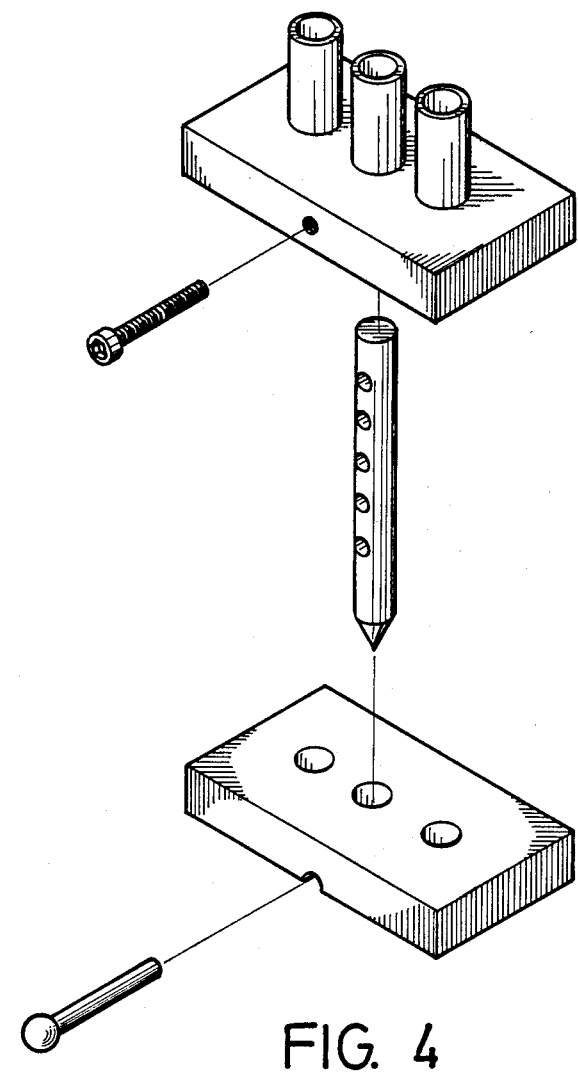
FIG. 4 is a perspective view of the prior art.

Referring now to FIGS. 1 through 4, and particularly to FIG. 3, a pair of guide posts 70 are shown inserted to the guide post holes 12 of the uppermost plate 10 as well as a plurality of weights 60. each of the weights 60 has three openings 62 therethrough to accommodate the guide posts 70 and weight post 40 and a groove 64 located on the lower surface such that the connector pin 45 can pass through the groove 64 to engage with the apertures 43 on the weight post 40.

In use, a desired amount of weights 60 is selected and the connector pin 45 is inserted through the groove 64 and into the corresponding aperture 43. The threaded plug 20 is then rotated in the direction to tighten the uppermost plate 10 to the weights 60. Once tight, the securing plug 30 is rotated to tighten the threaded plug 20. As a result, the connector pin 45 is held fast in the aperture 43 of the weight post 40, preventing any accidental loosening and the weights 60 are secured together to act as a single mass of weight for the exercise machine. In operation, there are no loose weights 60 to vibrate and rattle against each other and the guide posts 70 as with the prior art shown in FIG. 4. To change the desired weight, the preceding steps are simply reversed. In addition, for easy operation the gripping surfaces of the threaded plug 20 and the securing plug 30 may be knurled as shown in FIG. 1.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. An exercise machine weight guide, comprising
    an uppermost plate (10) having a mounting hole (11) and two guide post holes (12); said mounting hole (11) being stepped with an upper larger threaded hole (13) and a lower smaller smooth hole (14);
    an internally threaded plug (20) having a narrower cylindrical end (21) and an annular lip (22); said annular lip (22) having an outer diameter slightly larger than said lower smaller smooth hole (14) and smaller than said larger threaded hole (13);
    a securing plug (30) having a stepped central hole (31) which is complementary in shape and engageable to said threaded plug (20); said securing plug (30) consisting of a larger upper section (32) and a smaller externally threaded lower section (33), said threaded lower section (33) being engageable to said upper threaded hole (13) of said uppermost plate (10);
    a weight post (40) having a threaded end (41) which is threadedly engageable to said internally threaded plug (20) and a centrally axially threaded hole (42) for threadedly engaging a threaded screw eye (50); said weight post (40) having a plurality of apertures (43) evenly spaced lengthwise thereon so that a connector pin (45) is slidably insertable therein.

2. An exercise machine weight guide as claimed in claim 1, wherein said uppermost plate (10) is further provided with a hole (15) on one lateral side thereof for threadedly receiving a positioning bolt (16); a corresponding positioning slot (44) being further disposed on said weight post (40) for engaging with said positioning bolt (16), said weight post (40) being axially slidable and fixable by turning said threaded plug (20), said positioning bolt (16) preventing rotation of said weight post (40).

* * * * *